Dec. 6, 1955   J. T. EMERY   2,726,095
PORTABLE CARGO CRATE
Filed March 17, 1953   3 Sheets-Sheet 1

INVENTOR.
JACK T. EMERY,
BY:
Harold B. Hood,
ATTORNEY.

Dec. 6, 1955   J. T. EMERY   2,726,095
PORTABLE CARGO CRATE
Filed March 17, 1953   3 Sheets-Sheet 3

INVENTOR.
JACK T. EMERY,
BY:
Harold B. Hood.
ATTORNEY.

United States Patent Office 2,726,095
Patented Dec. 6, 1955

2,726,095

PORTABLE CARGO CRATE

Jack T. Emery, Indianapolis, Ind., assignor, by mesne assignments, to Albert Lieberman Application March 17, 1953, Serial No. 342,855

9 Claims. (Cl. 280—79.2)

The present invention relates to a portable cargo crate of the type intended to be loaded while standing on a dock and thereafter rolled into a truck, box car, or other carrier for transportation to a destination where it is rolled from the carrier and unloaded while standing on the dock, the carrier thereby being freed of the necessity of "laying over" while being unloaded.

The transportation industry, and especially the trucking division, has long been faced wtih the problem of the "partial load" and with the related problem of "tying up" a truck during the time-consuming loading operation. In order to show a profit, a truck must operate at something near full capacity at all times. Especially in the trucking industry, it is not always possible to obtain a full load bound for a common destination. The truck will take on a partial load at one place, other cargo at another place, etc., it not being uncommon to have as many as five or six separate cargoes bound for different destinations. Upon arriving at each of these destinations, it is necessary for the truck to wait, sometimes overnight, in order to be unloaded. Even where the entire load is bound for a single destination, the truck must first sit for hours while being loaded and sit for many more hours at its destination while being unloaded and reloaded for its return trip.

Such time consumed in loading and unloading is lost time so far as the operator is concerned. Each hour so spent must be paid for—not only for the truck itself but for the driver as well. This cost must, of necessity, be added to the overall cost of transporting the load and is therefore an added burden on the shipper.

In the past, many schemes have been devised in an effort to overcome these difficulties. The semi-trailer was adopted in order that the tractor and driver would be free to hook onto another trailer and continue to move, while the first trailer was being unloaded and reloaded to be picked up by another tractor and driven at a later time. This has proven to be only a partial solution, however. The trailer itself must be "tied up" during the loading and unloading operations. This results in the necessity for many more trailers than would be necessary if the time for unloading and reloading could be substantially reduced.

It is the object of this invention to provide means whereby the loading and unloading time will be reduced to a bare minimum. To this end, I provide a crate or cargo handling device having a capacity of only a fraction of that of the truck or trailer, such crates to be loaded while standing on a dock and capable of being moved immediately into the truck when it arrives. Partial loads can be confined to a single such crate and the entire crate quickly removed from the truck at its destination.

The primary object of my invention is to provide such a crate of extremely light weight but possessing structural features permitting it to carry loads as high as ten thousand pounds; and to this end, to provide wheel or roller means for such a crate so supporting and arranged on the crate as to permit easy movement of the crate even when carrying a maximum load.

A further object of the invention is to provide means for preventing the shifting of the crate in the truck during movement of the truck while on the highway.

Another object is to provide a crate of this type which can be easily dismantled for storage and transportation in a fraction of its normal volume.

The loading doors on carriers are not constructed with a standard width. Crates made large enough to pass through the widest door could not be used in trucks having narrower doors and crates made to pass the narrower doors would result in waste of space when used in trucks having wider doors. A still further object of my invention is, therefore, to provide such a crate so constructed as to be easily adjustable widthwise to permit its passage through any truck door while being as wide as possible for that particular truck.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Figure 1:
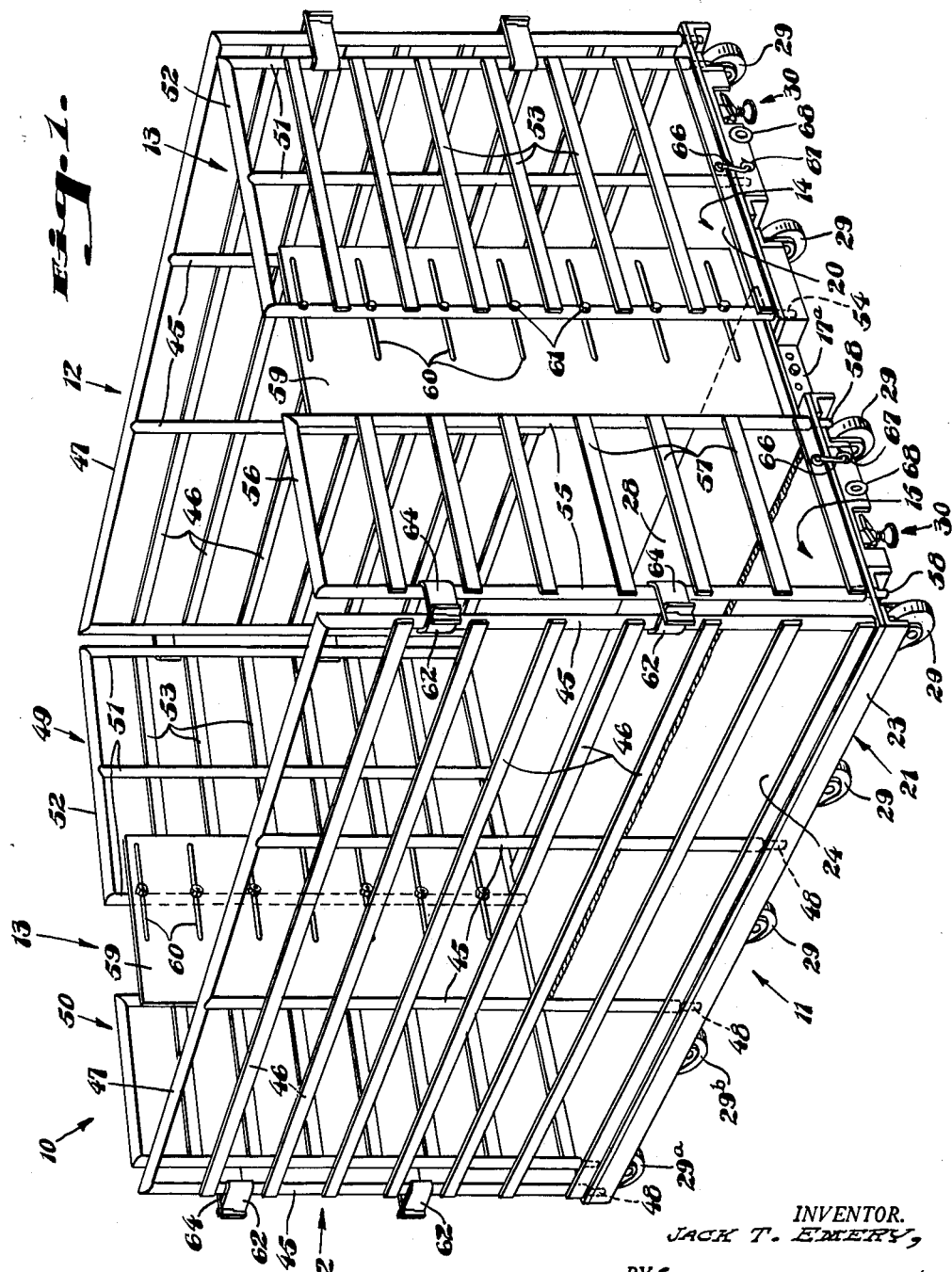
Fig. 1 is a perspective view of a preferred form of cargo crate constructed in accordance with my invention.
Figure 2:
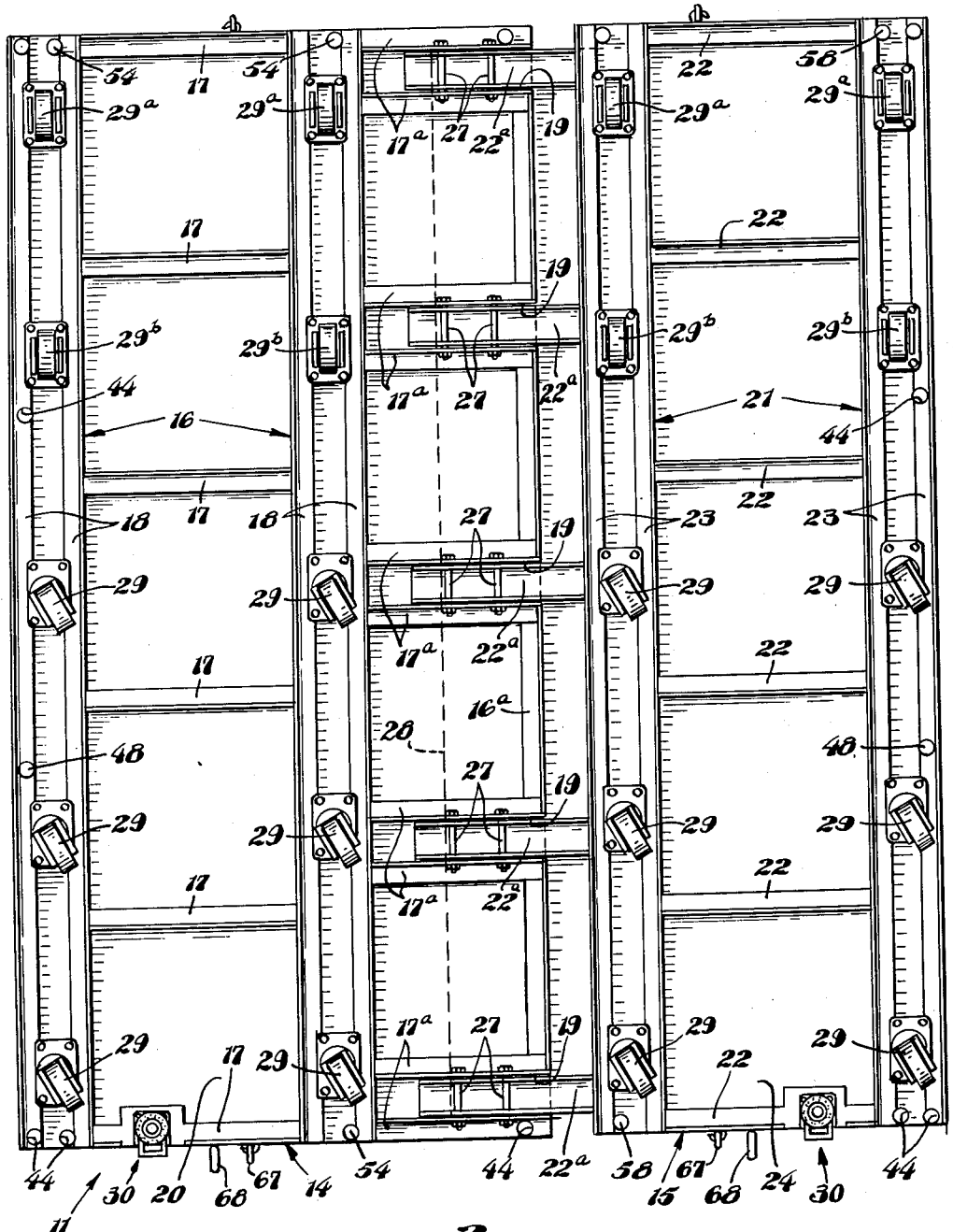
Fig. 2 is a bottom plan view of the crate of Fig. 1.
Figure 3:
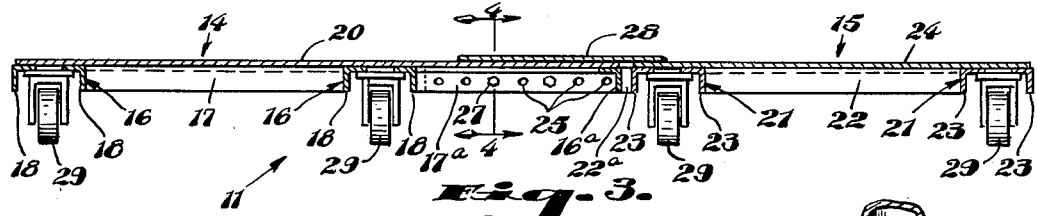
Fig. 3 is a transverse sectional view through the floor or platform of the crate of Fig. 1.
Figure 4:
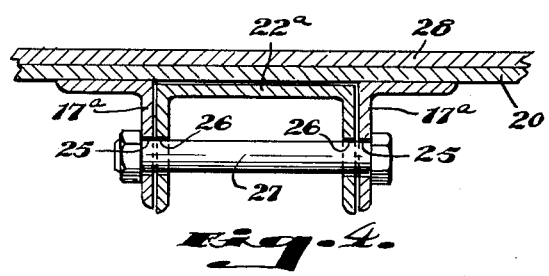
Fig. 4 is a sectional view taken substantially on line 4—4 of Fig. 3 showing a detail of my invention, and drawn on an enlarged scale.

Referring more particularly to the drawings, it will be seen that my crate 10 comprises a base or platform 11, side members 12, end members 13, and a plurality of rollers supporting the platform 11.

Platform 11 is formed in two sections 14 and 15. Section 14 has a frame comprising a plurality of longitudinal members 16 connected by a plurality of transverse members 17. At least two of the longitudinal members 16 are preferably formed of allochirally facing angle members 18—18 spaced slightly apart for a purpose later to become apparent. Obviously, a single U-shaped member could be substituted for the two angles 18—18, but I prefer to use the angles for the flexibility of construction which their use provides.

Along one side of the section 14, a longitudinal member 16a is connected to the adjacent member 16 by slightly spaced, transverse members 17a, here in the form of allochirally facing angles. Member 16a is cut away between the adjacent angles 17a to form laterally opening sockets 19 for a purpose soon to become apparent. A deck member 20 is fixed to completely cover the upper side of the frame thus formed.

Section 15 has a frame comprising a plurality of longitudinal members 21 connected by a plurality of transverse members 22. At least two of the longitudinal members are preferably formed of allochirally facing angle members 23—23 similar to angle members 18—18. From the outer side of one of members 21, a plurality of transverse members 22a project laterally. A deck member 24 is fixed to completely cover the upper side of the frame between the longitudinal members 21. This decking does not, however, extend over the transverse members 22a, as will be seen from an inspection of the drawings.

Members 22a are so spaced as to be registrable with and enterable into the sockets 19 of section 14. Members 17a are provided with a plurality of aligned holes 25 therethrough and the members 22a are each provided with a mating plurality of transverse holes 26. After entrance of members 22a into sockets 19, one or more bolts 27 are passed through aligned holes 25 and 26 to releasably retain members 22a in sockets 19 in any degree of penetration thereinto. As can be seen, the provision of the series of holes 25 and 26 provides simple and easy means for adjusting the overall width of the platform 11.

A further deck member 28 is fixed along one edge to the deck member of one of the sections 14 or 15. I have shown it fixed by welding to deck 24 and it overlaps deck 20 to span the gap between the two decks when the two sections are extended.

To each longitudinal member 16 and 21, I fix, by any desirable means, to the angles 18—18 and 23—23 thereof, a plurality of rollers 29. These rollers are preferably equidistantly spaced along the longitudinal members to form files longitudinally of the platform 11 and so arranged that they form ranks transversely of the platform 11. By so arranging the rollers, I have found that much greater loads can be supported on a platform constructed of much lighter material. In addition, since each section 14 and 15 is independently supported on its own rollers, all tendency for the platform to buckle at the juncture of its two sections is thereby eliminated. It is by this means that I have been able to construct a crate of this type capable of supporting and transporting loads far in excess of the weight of loads heretofore transportable on crates intended for a similar purpose.

While a crate of this type can be moved about rather easily by means of a "towmotor" or similar device, I have found that the turning of the crate about a corner is greatly facilitated by making certain of the rollers capable of swiveling about substantially vertical axes. To make all the rollers capable of swiveling, has proven disadvantageous since the crate will shift about in the truck, or similar carrier, during transportation of the crates. I have found the optimum arrangement to be that of making the two ranks of rollers 29a and 29b, adjacent one end of the crate, rigid, or non-swivelable, with the rollers of the remaining ranks swivelable, as stated above.

Thus, one end of the crate will be effectively restrained from moving side-wise during transportation thereof.

Figure 6:
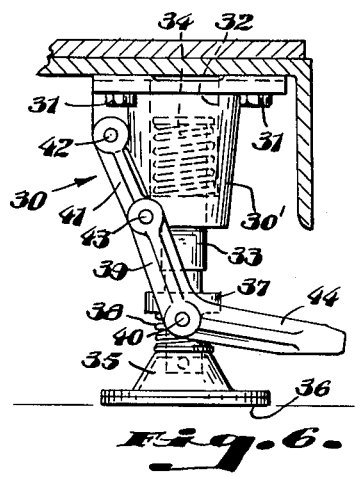
Fig. 6 is a side elevation of a preferred form of brake means used with my crate.

To prevent side-wise movement of the opposite end of the crate, as well as to effectively restrain movement of the entire crate, I provide brake means 30 mounted on the end of the platform opposite caster ranks 29a and 29b. I have found the brake shown in Fig. 6 to be most effective for this purpose, although it will be obvious that other forms of brake means can be used.

The brake used here is a commerically available form comprising a body 30' securable to the platform by means of screws 31 or the like. The body is provided with a vertical bore 32 in which is reciprocably received a plunger 33. A coiled spring 34 urges the plunger upwardly. A cup-shaped element 35, having an anti-friction material 36 on the lower face thereof, is sleeved on plunger 33 for axial movement thereon. A collar 37 is sleeved on plunger 33 between element 35 and body 30 and a coiled spring 38 is confined between collar 37 and element 35.

A bell-crank 39 is pivotally supported on collar 37, as at 40, and a link 41 is pivotally supported on body 30', as at 42. Link 41 is pivoted to one arm of bell-crank 39, as at 43, and the other arm 44 of the bell-crank serves as a manipulating piece for the brake.

The bell-crank and the link form a toggle and as pivot 43 moves through the line joining pivots 40 and 42, the brake becomes set. Spring 38 applies a pressure against element 35 which bears against the truck floor. By raising arm 44 to break the toggle, the brake is released. After the crate is properly positioned in a truck and the brakes 30 are set, the crate is effectively held by brakes 30 and the ranks of rigid rollers 29a and 29b against any accidental shifting while underway.

In order that the side and end walls can be easily removed from the platform, not only to facilitate loading and unloading but also to permit the dismantling of the crate for shipping when empty and for storage when not in use, I provide a plurality of upwardly-opening sockets 44 spaced about the periphery of platform 11. Sides 12 are each preferably formed of a plurality of vertical tubular members 45 and a plurality of horizontal slat members 46 as clearly shown in Fig. 1. A horizontal tubular member 47 may span the uprights 45 to add rigidity to the side. Each upright 45 carries a pin 48 at its lower end for entrance into one of the sockets 44.

Ends 13 are each formed in two sections 49 and 50. Section 49 is preferably formed of a plurality of tubular uprights 51 spanned by a horizontal member 52 and a plurality of slats 53. Each upright 51 is provided with a pin 54 at its lower end for entrance into one of the sockets 44 in platform section 14.

Section 50 is preferably formed of two or more tubular uprights 55 spanned by a tubular member 56 and a plurality of horizontal slats 57. Here, again, each upright 55 is provided with a pin 58 for entrance into one of the sockets 44 in platform section 15.

An end portion 59 is fixed to one end section (here to section 50) and overlaps the other section. Said portion is provided with a vertically spaced series of horizontal slots 60. Section 49 supports a plurality of bolts 61 taking through the slots with nut sturned up against portion 59 to clamp it to section 49. Thus, it will be seen that the width of the ends 13 can be easily adjusted as the width of platform 11 is changed.

Figure 5:
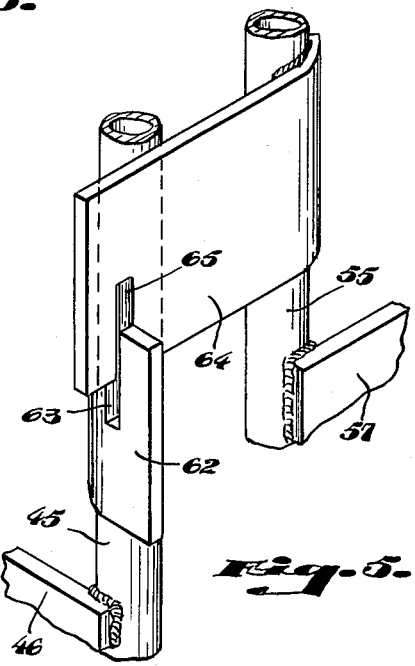
Fig. 5 is a fragmental perspective view of a detail of my invention showing one form of means for joining the sides and ends of my crate.

In Fig. 5, I have shown one means for effectively fixing the sides 12 to the ends 13. Upright 45 carries a bracket 62 having a vertically, upwardly-opening slot 63 therein, and upright 55 carries a bracket 64 having a vertically, downwardly-opening slot 65 therein. After sides 12 have been positioned on platform 11, ends 13 are placed thereon with the brackets 62 and 64 interlocking, as shown in Figs. 1 and 5. Sides 12 are thereby held against vertical displacement from the platform.

I further provide means for locking ends 13 to the platform. One such means is to provide a hook and eye arrangement. In Fig. 1, I have shown hooks 66 carried by ends 13, and eyes 67 carried by platform 11. Other means for this purpose could be used.

To provide means for manipulating the crate, I prefer to provide eye-bolts 68 on the end of the platform to which may be attached tow-bars or cables.

While a crate constructed in accordance with my invention is relatively simple and lightweight, it is this simplicity which makes it possible to perform a job heretofore impossible or impractical with the devices intended for this purpose. The novel construction of the platform and the positioning of the rollers thereon permit the handling of a load heretofore believed impossible of supporting in a crate of this type.

I claim as my invention:

1. A load transporting platform comprising two sections, one of said sections comprising a frame having a plurality of longitudinal members and a plurality of transverse members connecting said longitudinal members, the longitudinal members along one side of said frame being provided with a plurality of laterally opening sockets between adjacent ones of said transverse members, deck means supported upon said frame, and a plurality of rollers supported from said longitudinal members, said rollers being arranged to form files along said longitudinal members and ranks along lines transverse to said longitudinal members, and the other of said sections comprising a frame having a plurality of longitudinal members and a plurality of transverse members, certain of said transverse members projecting laterally from one of said longitudinal members for registry with the sockets in said one section, deck means supported on said frame, and a plurality of rollers supported upon said longitudinal members, said rollers being arranged to form files along said longitudinal members and ranks along lines transverse to said longitudinal members, the laterally projecting transverse members of said other section being telescopically enterable in the sockets of said one section, means for releasably retaining said members in said sockets in any desired degree of telescopic association, and further deck means fixed along one edge to the deck means of one of said sections and overlapping the deck means of the other of said sections to bridge the gap between the deck means of the two said sections.

2. The device of claim 1 in which the rollers of certain of said ranks are rigidly mounted on said longitudinal members and the rollers of the remaining ranks are mounted to swivel about substantially vertical axes, and including brake means carried by said platform on one end thereof and operable to restrain movement of said one end of said platform.

3. The device of claim 2 in which said certain ranks of rollers include the two ranks adjacent the end of the platform opposite said brake means.

4. A portable cargo crate comprising a platform, a plurality of rollers supporting said platform, side and end walls removably supported on said platform, means for releasably fixing said side walls to said end walls along the adjacent vertical edges thereof, and means for releasably fixing said end walls to said platform, said platform comprising two sections, one of said sections comprising a frame having a plurality of longitudinal members and a plurality of transverse members connecting said longitudinal members, the longitudinal member along one side of said frame being provided with a plurality of laterally opening sockets between adjacent ones of said transverse members, and deck means supported upon said frame, and the other of said sections comprising a frame having a plurality of longitudinal members and a plurality of transverse members connecting said longitudinal members, certain of said transverse members projecting laterally from one of said longitudinal members for registry with the sockets in said one section, and deck means supported upon said frame, the laterally projecting transverse members of said other section being telescopically enterable in the sockets of said one section, means for releasably retaining said members in said sockets in any desired degree of telescopic association, and further deck means fixed along one edge to the deck means of one of said sections and overlapping the deck means of the other of said sections, said rollers being arranged in files along the longitudinal members of said two sections and in ranks along lines transverse to said longitudinal members.

5. The device of claim 4 in which the said adjacent ones of the transverse members of said one section are each provided with a longitudinal series of transversely formed holes registering with the holes in the adjacent member, and the said laterally projecting transverse members of said other section are each provided with a longitudinal series of transversely formed holes registerable with the holes in said adjacent members of said one section, the means for releasably retaining said members in said sockets comprising bolts taking through the aligned holes in said members.

6. The device of claim 5 in which said platform is provided with a plurality of substantially vertically opening sockets spaced about the periphery thereof, said side and end walls being provided with downwardly projecting pins along the lower edges thereof for entrance into said sockets and including means for releasably fixing said side walls to said end walls along the adjacent vertical edges thereof and further means for releasably fixing said end walls to said platform, said end walls each comprising two sections, one section being supported entirely on one section of said platform and the other section being supported entirely on the other section of said platform, one of said end wall sections having a portion projecting laterally therefrom and overlapping the other such section, and means for releasably fixing said portion to said other section in any desired degree of separation of the two said sections.

7. The device of claim 6 in which said laterally projecting portion of said end wall section is provided with a vertically spaced plurality of horizontally extending slots, and the means for releasably fixing said portion to the said other section comprises a plurality of bolts supported from said other section and projecting through said slots, and nuts threaded on said bolts and engaging said portion to clamp it against said other section.

8. The device of claim 7 in which the rollers of certain of said ranks are rigidly mounted on said platform and the rollers of the remaining ranks are mounted to swivel about substantially vertical axes, and including brake means carried by said platform on one end thereof and operable to restrain movement of said one end of said platform.

9. The device of claim 8 in which said certain ranks of rollers include the two ranks adjacent the end of the platform opposite said brake means.

References Cited in the file of this patent

UNITED STATES PATENTS

| | | |
|---|---|---|
| 1,482,604 | Fitch | Feb. 5, 1924 |
| 1,695,929 | Perin | Dec. 18, 1928 |
| 1,789,391 | Roe | Jan. 20, 1931 |
| 2,011,965 | Ball | Aug. 20, 1935 |
| 2,360,874 | Herold | Oct. 24, 1944 |